United States Patent [19]

Nangrani

[11] Patent Number: 4,537,929
[45] Date of Patent: Aug. 27, 1985

[54] HIGH IMPACT NYLON COMPOSITION

[75] Inventor: Khemchand J. Nangrani, Evansville, Ind.

[73] Assignee: Plastic Specialties and Technologies, Inc., Neshanic Station, N.J.

[21] Appl. No.: 572,334

[22] Filed: Jan. 20, 1984

[51] Int. Cl.$^3$ ............................................... C08K 3/40
[52] U.S. Cl. ................................... 524/504; 524/139; 525/66
[58] Field of Search .................... 524/504, 139; 525/66

[56]  References Cited

U.S. PATENT DOCUMENTS

| | | | |
|---|---|---|---|
| 4,017,557 | 4/1977 | Hammer et al. | 525/66 |
| 4,362,846 | 12/1982 | Korber et al. | 525/66 |
| 4,381,366 | 4/1983 | Sanderson et al. | 524/504 |
| 4,404,312 | 9/1983 | Kokubu et al. | 524/504 |

*Primary Examiner*—Lewis T. Jacobs
*Attorney, Agent, or Firm*—Wood, Herron & Evans

[57] ABSTRACT

High impact nylon molding compounds are provided by maleating an ethylene-propylene copolymer at an elevated temperature in the presence of an organic peroxide initiator and thereafter grafting the maleated adduct thus prepared onto the free amino end group of a nylon polymer, such as nylon-6 or nylon-66, at an elevated temperature, illustratively by extrusion. A reinforced composite is obtained by extrusion-compounding the grafted nylon polymer with glass fiber.

25 Claims, No Drawings

HIGH IMPACT NYLON COMPOSITION

BACKGROUND OF THE INVENTION

The present invention relates to the preparation of high impact molding compounds based upon nylon.

It is known that a variety of approaches have been used in an attempt to improve the impact strength of polyamides, including nylon. A number of these efforts have involved the use of various additives, including acid-containing polyolefins. These additives of the prior art differ from those of the present invention in the absence of sites which adhere to the polyamide through sites of the polyamide or in the presence of unsaturation, as for example in the inclusion of a diene moiety in the additive.

The provision of means for achieving high impact resistance in nylon molding compounds remains an object of continuing research and effort due to the rigorous conditions of use to which such molding compounds are exposed.

SUMMARY OF THE INVENTION

According to the present invention nylon molding compounds of excellent impact strength are consistently produced by the following sequence of operations: (1) A suitable olefin polymer or copolymer is modified by treatment with an $\alpha,\beta$-ethylenically unsaturated carboxylic or derivative thereof at any elevated temperature and in the presence of an organic peroxide initiator; and (2) the adduct thus prepared is grafted onto the free amino group of a nylon polymer.

The grafted nylon polymer obtained is then compounded with a reinforcing material, such as glass fiber, to provide a product suitable for application in the molding of articles.

DESCRIPTION OF THE INVENTION

The nylons employed according to the present invention are polyamide substances well known in the art and include materials such as polyhexamethylene adipamide (nylon-66) and polycaprolactam (nylon-6). Examples of other polyamides embraced in the term nylon include polyhexamethylene azelamide (69 nylon), polyhexamethylene sebacamide (610 nylon) and polyhexamethylene dodecanoamide (612 nylon), polycaprolactam (nylon 6), polylauryl lactam, poly-11-amino-undecanoamide, bis-(paraaminocyclohexyl)methane dodecanoamide. Also included in the scope of this invention are copolymers, such as a copolymer of nylon 6,6, and polylactams, e.g. nylon 6 (polycaprolactam); and blends of polyamides, such as a mixture of nylon 6,6 and nylon 6. Preferably the condensation polyamides employed herein are polyhexamethylene adipamide (nylon 6,6) and polycaprolactam (nylon 6).

The olefin polymer can be any $C_3$ to $C_6$ olefin with polymers of ethylene, especially linear low density polyethylene, and copolymers of ethylene and propylene being particularly preferred.

The $\alpha,\beta$-ethylenically unsaturated carboxylic acid compound can be any $\alpha,\beta$-ethylenically unsaturated carboxylic acid of from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions.

Illustrative of such compounds are the following: maleic acid, maleic anhydride, maleic acid monoethyl ester, metal salts of acid monoethyl ester, fumaric acid, fumaric acid monoethyl ester, itaconic acid, vinyl benzoic acid, vinyl phthalic acid, metal salts of fumaric acid monoethyl ester, monoesters of maleic, fumaric, itaconic acids when R where R is up to 29 carbon atoms, e.g. methyl, propyl, isopropyl, butyl, isobutyl, hexyl, cyclohexyl, octyl, 2-ethyl hexyl, decyl, stearyl, methoxy ethyl, ethoxy ethyl, hydroxy ethyl, etc.

While any of the well known fillers and reinforcing agents can be employed in the nylon molding compounds of the present invention, the present invention is particularly concerned with glass fiber reinforced molding compounds. Other fillers and reinforcing agents which can be employed, optionally in conjunction with the glass fibers, are carbon fibers, metal fibers, amorphous silica, kaolin, asbestos, powdered quartz, chalk and the like.

In a particular aspect of the present invention, any of the generally known flame retardant additives can be incorporated into the nylon molding compositions disclosed herein. Thus, antimony trioxide or the known brominated or chlorinated organic materials flame retardant additives can be employed. Specific halogenated compounds are Pyro-Chek 77B, Pyro-Chek 68PB, Pyro-Chek 69PB, Dechlorane+ and PO64P.

Other conventionally employed additives can likewise be present, including stabilizers and inhibitors of oxidative, thermal and ultraviolet light degradation, lubricants and mold release agents, colorants including dyes and pigments, nucleating agents, plasticizers, etc.

The proportions of olefinic polymer to acid compound employed are in the range of from about 99.5% to 95% by weight of olefinic polymer and from about 0.5 to about 5.0% by weight of acid compound, with the use of 1% being preferred.

The adducts employed in the present invention can be prepared by any procedure which will effect an intimate contact of the acid compound and the olefinic polymer and heat the mixture to a temperature of from about 390° F. to about 500° F. A temperature of about 450° F. is preferred.

The admixture and heating is carried out in the presence of an organic peroxide initiator. Suitable peroxygen compounds are peroxyesters and diacyl peroxides.

The peroxyesters may be monoperoxyesters or the diperoxyesters of dicarboxylic acids or diols.

Representative peroxyesters include t-butyl peroxyacetate, t-butyl peroxyisobutylate, t-butyl peroxypivalate, t-butyl peroxyneodecanoate, t-butyl peroxybenzoate, t-butyl peroxyoctoate, t-butyl peroxy(2-ethylhexanoate), t-amyl peroxyneodecanoate, cumyl neodecanoate, isobutyl peroxypivalate, sec-butyl peroxybenzoate, n-butyl peroxyoctoate, t-butyl peroxy-3,3,5-trimethylhexanoate, t-butyl peroxy-2-methylbenzoate, 2,5-dimethyl-2,5-bis(2-ethylhexanoylperoxy)hexane, 2,5-dimethyl-2,5-bis(benzoylperoxy)hexane, 2,5-dimethyl-2,5-bis(octanoylperoxy)hexane, di-t-butyl diperoxyphthalate, t-butyl peroxymaleic acid, t-butyl peroxyisopropylcarbonate, di(sec-butyl)peroxydicarbonate, bis(4-t-butylcyclohexyl)peroxydicarbonate, diisopropyl peroxydicarbonate, di(n-propyl)peroxydicarbonate, di(2-ethylhexyl)peroxydicarbonate, dicyclohexyl peroxydicarbonate, dicetyl peroxydicarbonate and the like.

Aliphatic diacyl peroxides including acetyl peroxide, lauroyl peroxide, decanoyl peroxide and isononanoyl peroxide, as well as aromatic diacyl peroxides including benzoyl peroxide, p-chlorobenzyl peroxide and 2,4-dichlorobenzoyl peroxide may be used.

The peroxide is employed in the range of from about 0.3 to 0.05% by weight with 0.2% by weight being preferred.

With this technology residence times in the preparation of the adduct and of the grafted nylon polymer as low as 30 seconds are effective. However, use of somewhat longer residence times is not detrimental.

The adduct prepared as above is mixed with the nylon and melt compounded by extrusion at a temperature of from about 450° F. to about 550° F., thereby effecting grafting the production of a grafted nylon polymer. The relative proportions employed are from about 2% to about 40% of maleated adduct to from about 98% to about 60% of nylon compound.

The composition obtained can be subsequently admixed with any desired additives or combinations thereof. However, in its preferred embodiment the grafted nylon polymer composition is blended with glass fiber and passed through an extruder at an elevated temperature and pelletized. The resulting product is a molding composition which on molding provides finished articles of excellent impact strength without the sacrifice of other desirable properties.

The glass fibers can be employed in the range of from about 0–43% by weight of the final composition, the unreinforced composition itself being characterized by improved impact strength. However, the use of from about 13% to about 43% by weight is preferred.

The invention is illustrated in the following specific examples, which are intended for purposes of illustration only and are not to be construed as limitative of the present invention.

EXAMPLE 1

A. 98.8% by weight of linear low density polyethylene, 1.0% by weight of maleic anhydride and 0.2% by weight of dicumyl peroxide were intimately admixed. The resulting blend was processed in a single screw extruder having a screw speed of 80 rpm at temperatures of from 430° F. to 450° F. The issuing strands were passed through a water quench tank at 50°–60° F. and pelletized. The pellets were dried in a circulating air oven at 140° F. for about 8 hours.

B. 25.0% by weight of the maleated adduct from step A were blended with 74.8% by weight of nylon-66 and 0.2% by weight of Irganox 1171 B. The Irganox 1171 B employed in this and in succeeding examples is a 1:1 blend of organic phosphate antioxidant and of a hindered phenol antioxidant. The resulting blend was processed in a twin screw extruder at 125 rpm and at a temperature range of from 475° F. to 525° F. under vacuum. The feed was starved above the blend under a nitrogen blanket at the rate of 11 pounds per hour. The strands issuing from the extruder were passed through a water bath at 45°–55° F. and pelletized. The pellets were dried in a vacuum oven at 180° F. for about 8 hours.

C. 67.0% by weight of the graft nylon from step B was blended with 33.0% by weight of 3/16" glass fiber and the resulting composition was processed in a single screw extruder at 80 rpm and at temperatures of from 490° F. to 525° F. The strands issuing from the extruder were passed through a quench tank at 45°–55° F. and pelletized. The pellets were dried in a vacuum oven at 180° F. for about 8 hours.

Test bars of ¼ inch by ½ inch by 5 inches were injection molded from the molding composition prepared above. The test bars were evaluated using the tests set forth in Table I with the evaluation results set forth in Table I.

TABLE I

| | |
|---|---|
| Notched Izod ¼" (ft. lb/inch) | 4.7 |
| Unnotched Izod ¼" (ft. lb/inch) | 19.8 |
| *DTUL @ 264 psi (°F.) | 464 |
| Flexural Strength (psi) | 26600 |
| Moisture Content (%) | <0.2 |
| Color | Off White |

*DTUL = Deflection Temperature Under Load

EXAMPLE 2

A. 96.55% by weight of ethylene-propylene copolymer, 2.0% by weight of maleic anhydride, 0.3% by weight of dicumyl peroxide and 1.15% by weight of mineral oil were intimately admixed. The resulting blend was processed in a single screw extruder having a screw speed of 80 rpm at temperatures of from 430° F. to 450° F. The issuing strands were passed through a water quench tank at 50°–60° F. and pelletized. The pellets were dried in a circulating air oven at 140° F. for about 8 hours.

B. 20.0% by weight of the maleated adduct from step A were blended with 79.8% by weight of nylon-66 and 0.2% by weight of Irganox 1171 B. The resulting blend was processed in a twin screw extruder at 125 rpm and at a temperature range of from 475° F. to 525° F. under vacuum. The feed was starved above the blend under a nitrogen blanket at the rate of 11 pounds per hour. The strands issuing from the extruder were passed through a water bath at 45°–55° F. and pelletized. The pellets were dried in a vacuum oven at 180° F. for about 8 hours.

C. 67.0% by weight of the graft nylon from step B was blended with 33.0% by weight of 3/16" glass fiber and the resulting composition was processed in a single screw extruder at 80 rpm and at temperatures of from 490° F. to 525° F. The strands issuing from the extruder were passed through a quench tank at 45°–55° F. and pelletized. The pellets were dried in a vacuum oven at 180° F. for about 8 hours.

Test bars of ¼ inch by ½ inch by 5 inches were injection molded from the molding composition prepared above. The test bars were evaluated using the tests set forth in Table II with the evaluation results set forth in Table II.

TABLE II

| | |
|---|---|
| Notched Izod ¼" (ft. lb/inch) | 5.6 |
| Unnotched Izod ¼" (ft. lb/inch) | 21.5 |
| DTUL @ 264 psi (°F.) | 464 |
| Flexural Strength (psi) | 26100 |
| Moisture Content, % | <0.2 |
| Color | Off White |

EXAMPLE 3

A. 96.55% by weight of ethylene-propylene copolymer, 2.0% by weight of maleic anhydride, 0.3% by weight of dicumyl peroxide and 1.15% by weight of mineral oil were intimately admixed. The resulting blend was processed in a single screw extruder having a screw speed of 80 rpm at temperatures of from 430° F. to 450° F. The issuing strands were passed through a water quench tank at 50°–60° F. and pelletized. The pellets were dried in a circulating air oven at 140° F. for about 8 hours.

B. 20.0% by weight of the maleated adduct from step A were blended with 79.8% by weight of nylon-6 and 0.2% by weight of Irganox 1171 B. The resulting blend was processed in a twin screw extruder at 125 rpm and at a temperature range of from 410° F. to 460° F. under vacuum. The feed was starved above the blend under a nitrogen blanket at the rate of 11 pounds per hour. The strands issuing from the extruder were passed through a water bath at 45°–55° F. and pelletized. The pellets were dried in a vacuum oven at 180° F. for about 8 hours.

C. 67.0% by weight of the graft nylon from step B was blended with 33.0% by weight of 3/16" glass fiber and the resulting composition was processed in a single screw extruder at 80 rpm and at temperature of from 490° F. to 500° F. The strands issuing from the extruder were passed through a quench tank at 45°–55° F. and pelletized. The pellets were dried in a vacuum oven at 180° F. for about 8 hours.

Test bars of ¼ inch by ½ inch by 5 inches were injection molded from the molding composition prepared above. The test bars were evaluated using the tests set forth in Table III with the evaluation results set forth in Table III.

TABLE III

| | |
|---|---|
| Tensile Strength @ Break (psi) | 19,000 |
| Elongation (%) | 4.6 |
| Notched Izod, ¼" (ft-lbs/in) | 4.4 |
| Flexural Strength (psi) | 28,200 |
| Flexural Modulus (psi) | 1,121,500 |
| Deflection Temperature Under Load @ 264 psi (°F.) | 400 |
| Specific Gravity | 1.34 |

EXAMPLES 4–7

Grafted adducts prepared employing the materials and the proportions shown in Table IV in accordance with the procedures set forth in Examples 2A and 2B were injection molded to provide test bars of ¼ inch by ½ inch by 5 inches. These bars were evaluated and compared with bars prepared from nylon-66 itself designated as Example 4. The results are set forth in Table IV.

TABLE IV

| Properties of Unreinforced Nylon | | | | |
|---|---|---|---|---|
| Example No. | 4 | 5 | 6 | 7 |
| Nylon 66 | 100.0 | 83.84 | 82.83 | 79.454 |
| Ethylene-Propylene Copolymer | X | 15.448 | 16.414 | 19.31 |
| Maleic Anhydride | X | 0.326 | 0.340 | 0.6 |
| Di Cumyl Peroxide | X | 0.048 | 0.051 | 0.09 |
| Mineral Oil | X | 0.18 | 0.195 | 0.346 |
| Irganox 1171 B | X | 0.16 | 0.17 | 0.2 |
| Tensile Strength, psi | 12,000 | 7,800 | 7,600 | 7,000 |
| Flexural Strength, psi | — | 9,800 | 9,600 | 8,500 |
| Flexural Modulus, psi $\times 10^5$ | 4.1 | 2.64 | 2.63 | 2.40 |
| Notched Izod, ft-lbs/in | 1.0 | 6.0 | 8.0 | 17.0 |
| Heat Deflection Temperature Under Load at 264 psi, °F. | 194 | 164 | 142 | 140 |

EXAMPLES 8–24

In these examples varying amounts of the polymer of Example 2B were compounded with differing amounts of glass fibers. Test bars were injection molded from the resulting compositions and the effects on several properties, particularly on impact strengths, were evaluated. Control examples contained no Example 2B polymer. The results are set forth in Table V.

TABLE V

| Properties of Reinforced High Impact Nylon | | | | | | | | | |
|---|---|---|---|---|---|---|---|---|---|
| Ex. No. | 8 | 9 | 10 | 11 | 12 | 13 | 14 | 15 | 16 |
| Nylon 66 | 85.9 | 57.9 | 28.9 | — | 65.9 | 62.9 | 59.9 | 56.9 | 53.9 |
| Polymer of Ex. 2B | — | 29.0 | 58.0 | 86.9 | — | 3.0 | 6.0 | 9.0 | 12.0 |
| Sodium Benzene Phosphinate | 0.1 | 0.1 | 0.1 | 0.1 | 0.1 | 0.1 | 0.1 | 0.1 | 0.1 |
| Glass Fiber | 13.0 | 13.0 | 13.0 | 13.0 | 34.0 | 34.0 | 34.0 | 34.0 | 34.0 |
| Tensile Strength, psi | 15,800 | 15,400 | 12,700 | 10,400 | 29,100 | 28,700 | 28,500 | 27,600 | 27,400 |
| Elongation | 3.7 | 5.6 | 5.8 | 5.6 | 4.8 | 4.6 | 4.7 | 4.9 | 4.8 |
| Izod Impact ¼" (ft-lbs/in) | 0.8 | 2.1 | 2.9 | 4.4 | 1.81 | 1.97 | 2.22 | 2.53 | 2.79 |
| Deflection Temp. Under Load @ 264 psi, °F. | 470 | 456 | 448 | 416 | 488 | 484 | 484 | 480 | 484 |

| Ex. No. | 17 | 18 | 19 | 20 | 21 | 22 | 23 | 24 |
|---|---|---|---|---|---|---|---|---|
| Nylon 66 | 44.0 | 22.0 | 12.7 | — | 57.0 | 37.0 | 19.1 | — |
| Polymer of Ex. 2B | 21.9 | 43.7 | 53.2 | 65.9 | — | 20.0 | 37.1 | 56.9 |
| Sodium Benzene Phosphinate | 0.1 | 0.1 | 0.1 | 0.1 | 0.1 | 0.1 | 0.1 | 0.1 |
| Glass Fiber | 34.0 | 34.0 | 34.0 | 34.0 | 43.0 | 43.0 | 43.0 | 43.0 |
| Tensile Strength, psi | 22,700 | 19,700 | 20,300 | 18,700 | 29,800 | 27,200 | 23,500 | 20,100 |

TABLE V-continued

| Properties of Reinforced High Impact Nylon | | | | | | | | |
|---|---|---|---|---|---|---|---|---|
| Elongation | 4.8 | 5.1 | 5.9 | 5.9 | 4.4 | 4.9 | 5.3 | 5.3 |
| Izod Impact ⅛" (ft-lbs/in) | 2.9 | 3.7 | 4.9 | 5.6 | 2.2 | 3.3 | 4.1 | 5.1 |
| Deflection Temp. Under Load @ 264 psi, °F. | 476 | 468 | 468 | 464 | 480 | 476 | 474 | 450 |

What is claimed is:

1. A fiber-reinforced molding composition comprising a grafted polyamide resin and a fiber-reinforcing material, said grafted polyamide resin obtained by heating a polyamide resin with an adduct of a polyethylene polymer and an α,β-ethylenically unsaturated dicarboxylic acid compound.

2. A composition according to claim 1 wherein the polyethylene polymer is employed in the range of from about 99.5% to about 95% by weight and the acid compound is employed in the range of from about 0.5% to about 5.0% by weight.

3. A composition according to claim 2 wherein the adduct is present in the amount of from about 2% to about 40% by weight and the nylon compound is present in the amount of from about 98% to about 60% by weight.

4. A composition according to claim 3 wherein the fiber-reinforcing material is glass fiber.

5. A composition according to claim 4 wherein the glass fibers are employed in the amount of 0% to 43% by weight of the total composition.

6. A composition according to claim 5 wherein the glass fibers are employed in the amount of about 13% to about 43% by weight.

7. A composition according to claim 5 wherein an antioxidant is present.

8. A composition according to claim 7 wherein the antioxidant is a 1:1 blend of an organic phosphite antioxidant and of a hindered phenol antioxidant.

9. A composition according to claim 5 wherein the polyethylene polymer is linear low density polyethylene.

10. A composition according to claim 9 wherein the α,β-ethylenically unsaturated dicarboxylic acid compound is maleic anhydride.

11. A composition according to claim 9 wherein the polyethylene polymer is a copolymer of ethylene and propylene.

12. A composition according to claim 11 wherein the α,β-ethylenically unsaturated dicarboxylic acid compound is maleic anhydride.

13. A composition according to claim 5 wherein the polyamide resin is polycapramide.

14. A composition according to claim 5 wherein the polyamide resin is polyhexamethylene adipamide.

15. A molded product obtained by injection molding the composition of claim 1.

16. A method of making a fiber-reinforced molding composition comprising reacting a polyethylene polymer with an α,β-ethylenically unsaturated dicarboxylic acid or a derivative thereof at an elevated temperature and in the presence of an organic peroxide initiator to produce an adduct of said polyethylene polymer, intimately mixing said adduct with a polyamide under the action of heat to make a grafted polyamide resin, and compounding said grafted polyamide with a fiber-reinforcing material to make said fiber-reinforced molding composition.

17. The method of claim 16 in which said adduct is intimately mixed with said polyamide in a screw extruder.

18. The method of claim 17 in which said composition is pelletized after extrusion, said pellets upon molding providing finished articles of excellent impact strength.

19. The method according to claim 16 wherein said adduct is prepared over reaction time of about 30 seconds.

20. The method according to claim 16 wherein the adduct is present in the amount of from about 2% to about 40% by weight and the nylon compound is present in the amount of from about 98% to about 60% by weight.

21. The method according to claim 20 wherein the fiber-reinforcing material is glass fiber.

22. The method according to claim 21 wherein glass fibers are employed in the amount of about 13% to about 43% by weight.

23. The method according to claim 16 wherein the polyethylene polymer is a copolymer of ethylene and another olefin.

24. The method according to claim 23 wherein said other olefin is polypropylene.

25. The method according to claim 16 wherein a molded product is obtained by injection molding.

* * * * *